Sept. 14, 1954 P. K. WEIMER 2,689,270
COLOR TELEVISION CAMERA
Filed June 29, 1951
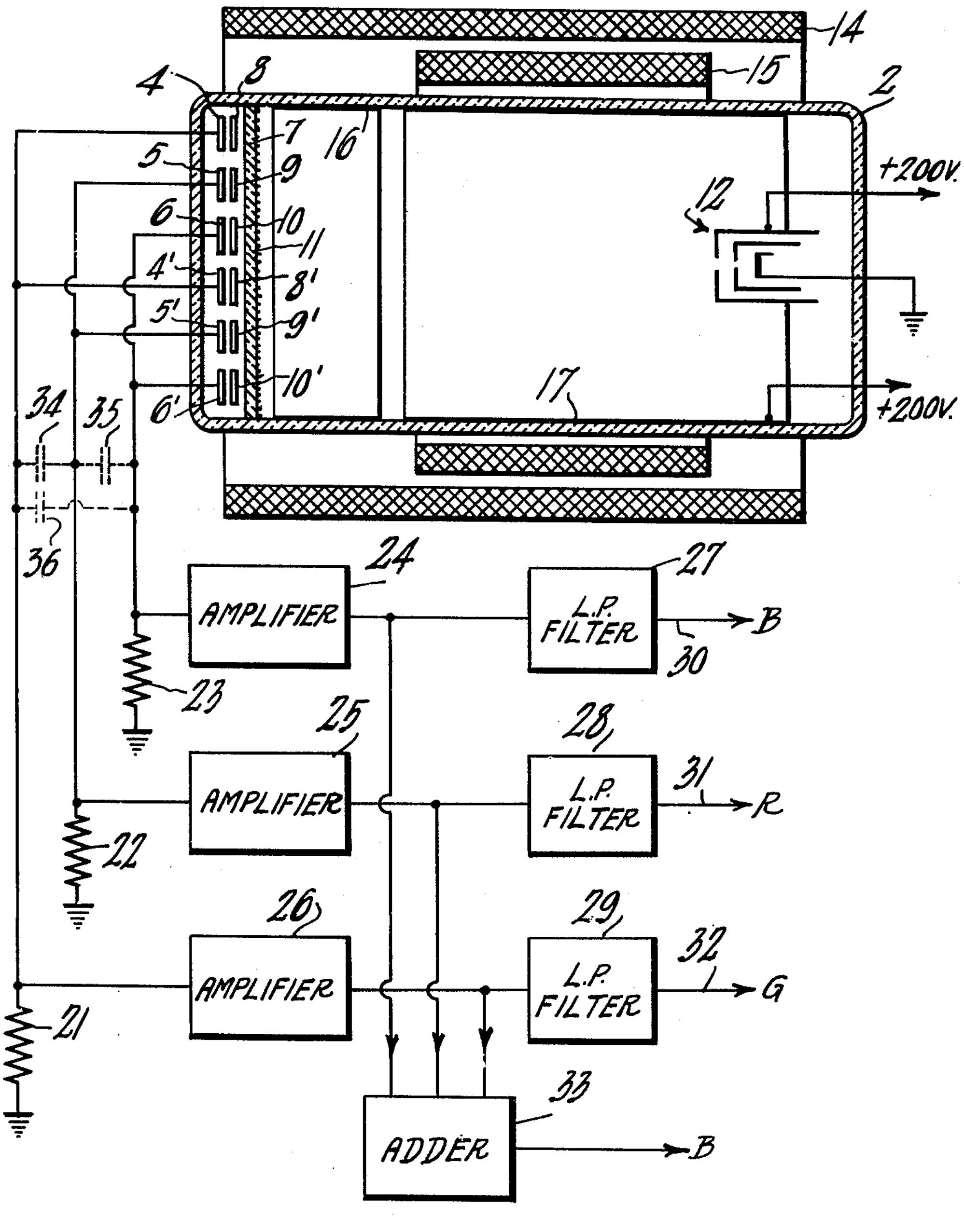
INVENTOR
Paul K. Weimer
BY
ATTORNEY Patented Sept. 14, 1954 2,689,270

UNITED STATES PATENT OFFICE 2,689,270

COLOR TELEVISION CAMERA

Paul K. Weimer, Princeton, N. J., assignor to Radio Corporation of America, a corporation of Delaware Application June 29, 1951, Serial No. 234,401

2 Claims. (Cl. 178—5.4)

This invention relates to apparatus for generating color television signals.

In most color television systems, each of the signals generated by the pickup apparatus corresponds to the low and high frequency variations in intensity of each of the primary colors. However, color television systems have recently been proposed in which the signal representing each primary color may be limited to a rather low frequency if an additional signal representing low and high frequency variations in brightness is also available. In this latter system, signals representing both the low and high frequencies of each primary color may be derived by the scanning action of a separate beam of electrons. These color signals can then be added together to produce full band brightness signal. However, such an arrangement requires precise registration between the different color signals. Alternatively, the low frequency color signals could be derived by one means and the full band brightness signal by another.

However, according to the principal object of this invention, improved apparatus is provided for deriving separate low frequency color signals and full band brightness signals.

Briefly, this objective may be reached by employing a plurality of means each adapted to separately and simultaneously derive a different low frequency color signal, each of said means being coupled together for high frequencies. The low frequency color signals, and the mixed high frequencies that are coupled from one color signal deriving means to another, can be added together to form a brightness signal.

The manner in which this may be done will be more clearly understood from the following detailed consideration of the drawing. A single beam cathode ray pickup tube 2 may employ, for example, the type of target described in the U. S. Patent No. 2,446,249, Alfred C. Schroeder, issued August 3, 1948. Transparent strips of conducting material such as 4, 5, 6, 4′, 5′ and 6′ are attached to the object side of a sheet of mica 7 in registry with optical filter strips 8, 9, 8′, 9′ and 10′. The strips 4, 4′ may be adapted to transmit green light, the strips 5, 5′ red light and the strip 6, 6′ blue light. The beam or scanned side of the mica sheet 7 is coated uniformly with any well known panchromatic photoemitter 11.

The photoemitter 11 is positively charged at any particular point in accordance with the intensity of the respectively colored light that reaches it through the electrical conducting strips 4, 5, and 6 and the corresponding optical strips 8, 9, and 10.

A standard type of electron gun 12 directs a beam of electrons toward the photoemitter 11. The beam is focused by a focus coil 14 and deflected vertically and horizontally by a standard deflection yoke 15. The electrons in the beam are slowed down by a decelerating ring 16 in a well known manner so that they arrive at the photoemitter 11 with nearly zero velocity.

Sufficient electrons to neutralize the positive charge at the photoemitter are removed from the beam. The remaining electrons fall back toward the gun 12 and may be picked up by a collector ring 17. The neutralizing electrons effectively discharge the condensers formed by the conducting strips 4, 5, and 6, the mica sheet 7 and the photoemitter 11. The condenser discharge currents derived at the conducting strips 4, 5, and 6 pass to ground through the load resistors 21, 22, and 23 respectively. The signal voltages thus developed across the load resistors 21, 22, and 23 are passed through amplifiers 24, 25, and 26 and low pass filters 27, 28, and 29 respectively so as to yield the low frequency blue, red, and green color signals at output leads 30, 31, and 32.

The conducting strips 4, 5, and 6 and the corresponding optical filters 8, 9, and 10 that are in registry with them have been drawn with a greatly exaggerated relative scale. Actually there would be several hundred optical filters for any single color. With proper adjustment of the current in the focus coil 14, the effective cross sectional area of the beam at the photoemitter 11 can be made sufficiently large so that the beam impinges on part of the areas of the photoemitter 11 behind three strips such as 4, 5, and 6. It will be noted that regardless of the orientation of the strips 4, 5, and 6 with respect to the scanning action of the beam of electron signals of each color are simultaneously generated. As a portion of the beam leaves the area of the photoemitter 11 behind one color filter, another portion of the beam moves into the area of the photoemitter 11 behind a filter adapted to pass the same color light. For example, assume in this exaggerated view that the beam is at one moment straddling the areas behind the green, red, and blue optical strips 8, 9, and 10 respectively and that its lagging edge is deflected downward. As it moves from the area behind the optical strip 8 its leading edge moves to the area behind the optical strip 8′ that also passes green light.

The brightness signal is derived in the following manner. If there is sufficient capacity between the conducting strips as indicated by the dotted-link representations of condensers 34, 35 and 36, the high frequency variations of the different color signals are mixed together. That is, the inter-strip capacities 34, 35, and 36 present such a low impedance to the high frequency variations of the respective color signals that substantial cross-feeding between the respective strip sets occurs, and substantially similar mixed high signals appear across each of the resistors 21, 22 and 23. Both low and high frequencies are amplified in the amplifiers 24, 25, and 26 before being applied to an adder 33 so as to form a brightness signal.

What is claimed is:

1. In a color television pickup system for developing image representative signals, the combination comprising a cathode-ray tube having an electron target structure including a plurality of conducting strips for simultaneously developing a plurality of output signals, the low frequency components of each of said output signals being essentially representative of respectively different component color variations in said image, the high frequency components of each of said output signals being essentially representative of brightness variations in said image, means for combining said output signals so as to provide a broad band brightness signal, a plurality of low pass filters, and means for applying each of said output signals to a respectively different one of said low pass filters so as to provide a plurality of respectively different component color signals.

2. A color television camera including a tricolor camera tube having three component color signal output circuits, an electron target structure within said tube including three sets of interleaved conducting strips, a coupling of relatively low impedance at high signal frequencies existing between each of said sets of conducting strips and each of the other sets of conducting strips, means including a scanning beam for causing currents to flow in the conducting strips of each set which are representative of a respectively different one of said component colors, means for coupling each of said sets of conducting strips to a respectively different one of said signal output circuits so as to develop therein a broad band output signal which includes low frequency components essentially representative of only the respective one of said component colors associated with said set and mixed high frequency components representative of all of said component colors, an adder, means for coupling all of said signal output circuits to said adder so as to produce a broad band brightness signal, and low pass filter means respectively coupled to each of said signal output circuits so as to derive respective low frequency component color signals.

References Cited in the file of this patent

UNITED STATES PATENTS

| Number | Name | Date |
| --- | --- | --- |
| 2,492,926 | Valensi | Dec. 27, 1949 |
| 2,509,038 | Goldsmith | May 23, 1950 |
| 2,554,693 | Bedford | May 29, 1951 |